US012589963B2

(12) United States Patent
Yamada et al.

(10) Patent No.: US 12,589,963 B2
(45) Date of Patent: Mar. 31, 2026

(54) ULTRASONIC DEVICE AND MEDIUM TRANSPORT DEVICE

(71) Applicant: SEIKO EPSON CORPORATION, Tokyo (JP)

(72) Inventors: Masayoshi Yamada, Shiojiri (JP); Eiji Osawa, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 272 days.

(21) Appl. No.: 18/466,266

(22) Filed: Sep. 13, 2023

(65) Prior Publication Data

US 2024/0083704 A1     Mar. 14, 2024

(30) Foreign Application Priority Data

Sep. 14, 2022     (JP) ................................. 2022-145930

(51) Int. Cl.
B65H 7/12          (2006.01)
B65H 5/06          (2006.01)
G01B 17/02         (2006.01)

(52) U.S. Cl.
CPC ............. B65H 7/125 (2013.01); B65H 5/062 (2013.01); B65H 2511/524 (2013.01); B65H 2801/39 (2013.01); G01B 17/02 (2013.01)

(58) Field of Classification Search
CPC .. B65H 7/125; B65H 2511/524; B65H 5/062; B65H 2553/30; B65H 2801/39; G01B 17/02
USPC .......................................................... 73/632
See application file for complete search history.

(56) References Cited

U.S. PATENT DOCUMENTS

2016/0255225 A1* 9/2016 Yamamoto ......... H04N 1/00602
                                                 358/1.12
2020/0039774 A1* 2/2020 Yamada ................. G01N 29/04

FOREIGN PATENT DOCUMENTS

| CN | 101596127 A | * | 12/2009 |
| CN | 201748957 U | * | 2/2011 |
| CN | 202676188 U | * | 1/2013 |
| CN | 203209291 U | * | 9/2013 |
| JP | 2020-025242 A | | 2/2020 |
| JP | 2020141270 A | * | 9/2020 |

(Continued)

OTHER PUBLICATIONS

Translation CN_201748957 (Year: 2011).*

*Primary Examiner* — Peter J Macchiarolo
*Assistant Examiner* — Monica S Young
(74) *Attorney, Agent, or Firm* — Harness, Dickey & Pierce, P.L.C.

(57)          ABSTRACT

An ultrasonic device includes: an ultrasonic element that has a transmission surface transmitting an ultrasonic wave and that transmits the ultrasonic wave in a direction intersecting the transmission surface; a wiring arranged at a transmission surface outer circumference of the transmission surface and coupled to the ultrasonic element; a shield covering the wiring; a holder arranged at a shield outer circumference of the shield and extending in the direction; and a protector facing the transmission surface and having a hole through which the ultrasonic wave passes. The shield is provided with a shield opening that faces the transmission surface. The holder is provided with a holder opening that faces the transmission surface. The protector is arranged at the holder opening.

8 Claims, 8 Drawing Sheets

(56)  References Cited

FOREIGN PATENT DOCUMENTS

WO   WO-2013189143 A1 * 12/2013   .............. G10K 9/22

\* cited by examiner

ULTRASONIC DEVICE AND MEDIUM TRANSPORT DEVICE

The present application is based on, and claims priority from JP Application Serial Number 2022-145930, filed Sep. 14, 2022, the disclosure of which is hereby incorporated by reference herein in its entirety.

BACKGROUND

1. Technical Field

The present disclosure relates to an ultrasonic device and a medium transport device.

2. Related Art

An ultrasonic device that detects a target object, using an ultrasonic wave, is known. An ultrasonic device described in JP-A-2020-25242 detects multiple-sheet feeding. The ultrasonic device has an ultrasonic element, a shield unit, and a protector. The ultrasonic element transmits an ultrasonic wave along a first axis. The shield unit extends along the first axis and has a passage hole that allows the passage of an ultrasonic wave at a distal end part of the extension. The protector is provided, covering the passage hole.

In the ultrasonic device in which the shield unit supports the protector, it is difficult to restrain a drop in detection accuracy due to multiple reflection of the ultrasonic wave by the protector and reflection of the ultrasonic wave by the shield unit.

SUMMARY

According to an aspect of the present disclosure, an ultrasonic device includes: an ultrasonic element that has a transmission surface transmitting an ultrasonic wave and that transmits the ultrasonic wave in a direction intersecting the transmission surface; a wiring arranged at a transmission surface outer circumference of the transmission surface and coupled to the ultrasonic element; a shield covering the wiring; a holder arranged at a shield outer circumference of the shield and extending in the direction facing the transmission surface and having a hole through which the ultrasonic wave passes. The shield is provided with a shield opening that faces the transmission surface. The holder is provided with a holder opening that faces the transmission surface. The protector is arranged at the holder opening.

According to another aspect of the present disclosure, a medium transport device that transports a medium is provided. The medium transport device includes an ultrasonic transmission unit including: a medium transport path through which the medium is transported; a holder having a holder opening; an ultrasonic element arranged spaced apart from the medium transport path in relation to the holder and transmitting an ultrasonic wave; a wiring arranged at a transmission surface outer circumference of a transmission surface of the ultrasonic element and coupled to the ultrasonic element; a shield covering the wiring; and a protector facing the transmission surface of the ultrasonic element and having a hole through which the ultrasonic wave passes. The shield is provided with a shield opening that faces the transmission surface. The holder opening faces the transmission surface. The protector is arranged at the holder opening.

DESCRIPTION OF EMBODIMENTS

Figure 1:
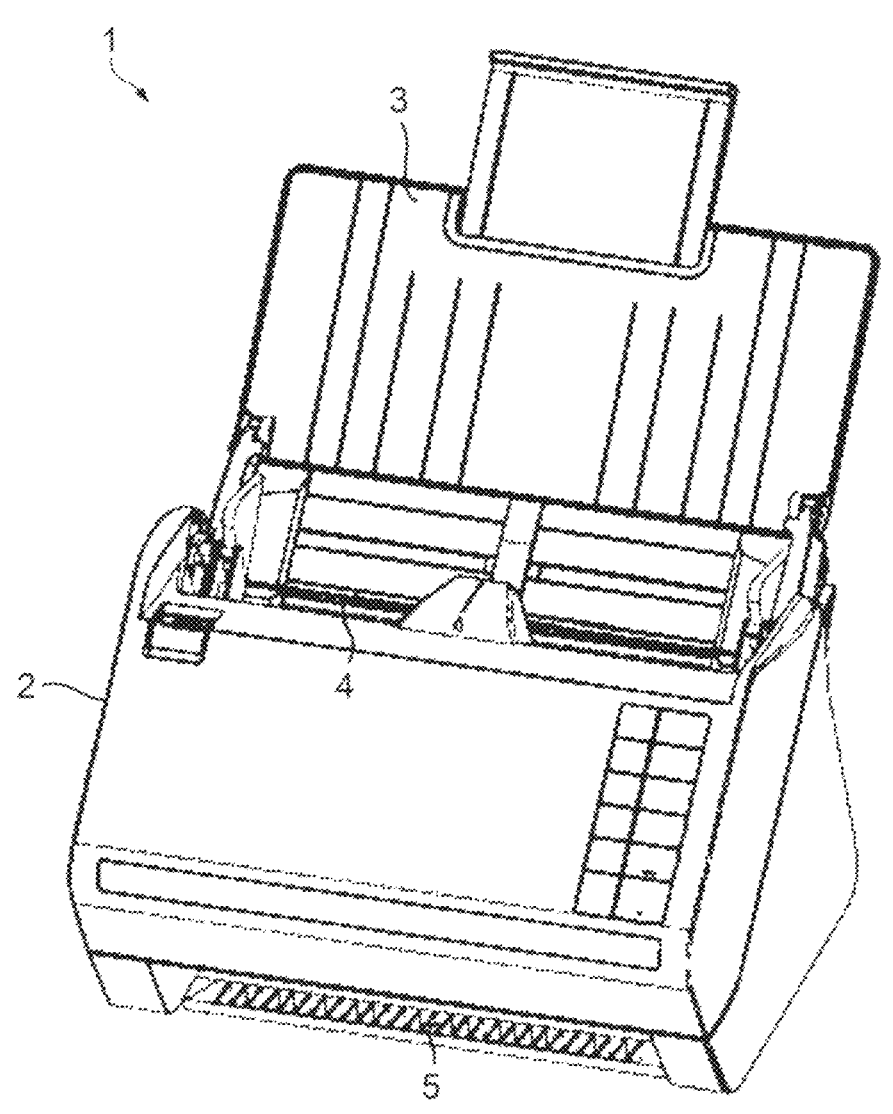
FIG. 1 shows an external configuration of an image scanner.

FIG. 1 shows an external configuration of an image scanner 1. FIG. 1 shows a perspective view of the image scanner 1. The image scanner 1 is an example of an electronic device having an ultrasonic sensor 9. The image scanner 1 is a reading device that reads a document M. The image scanner 1 is equivalent to an example of a medium transport device. The document M is equivalent to an example of a medium. The image scanner 1 has an exterior 2 and a document support 3.

The exterior 2 forms the outer circumference of the image scanner 1. The exterior 2 covers a reading unit 8, the ultrasonic sensor 9, a transport path 12, and the like. The reading unit 8, the ultrasonic sensor 9, and the transport path 12 will be described later. The exterior 2 is provided with a supply port 4 and a discharge port 5.

The document support 3 is configured to place the document M thereon. The document support 3 is configured in such a way that a plurality of documents M can be placed thereon. The document support 3 is arranged above the exterior 2. The document support 3 is provided at a position coupled to the supply port 4.

The supply port 4 supplies the document M placed on the document support 3 to inside the exterior 2. The supply port 4 is coupled to the document support 3. The supply port 4 is arranged at an upper part of the exterior 2. The document M supplied from the supply port 4 is read by the reading unit 8.

The discharge port 5 discharges the document M transported inside the exterior 2, to outside the exterior 2. The discharge port 5 discharges the document M read by the reading unit 8 to outside the exterior 2. The discharge port 5 is provided at a lower part of the exterior 2.

Figure 2:
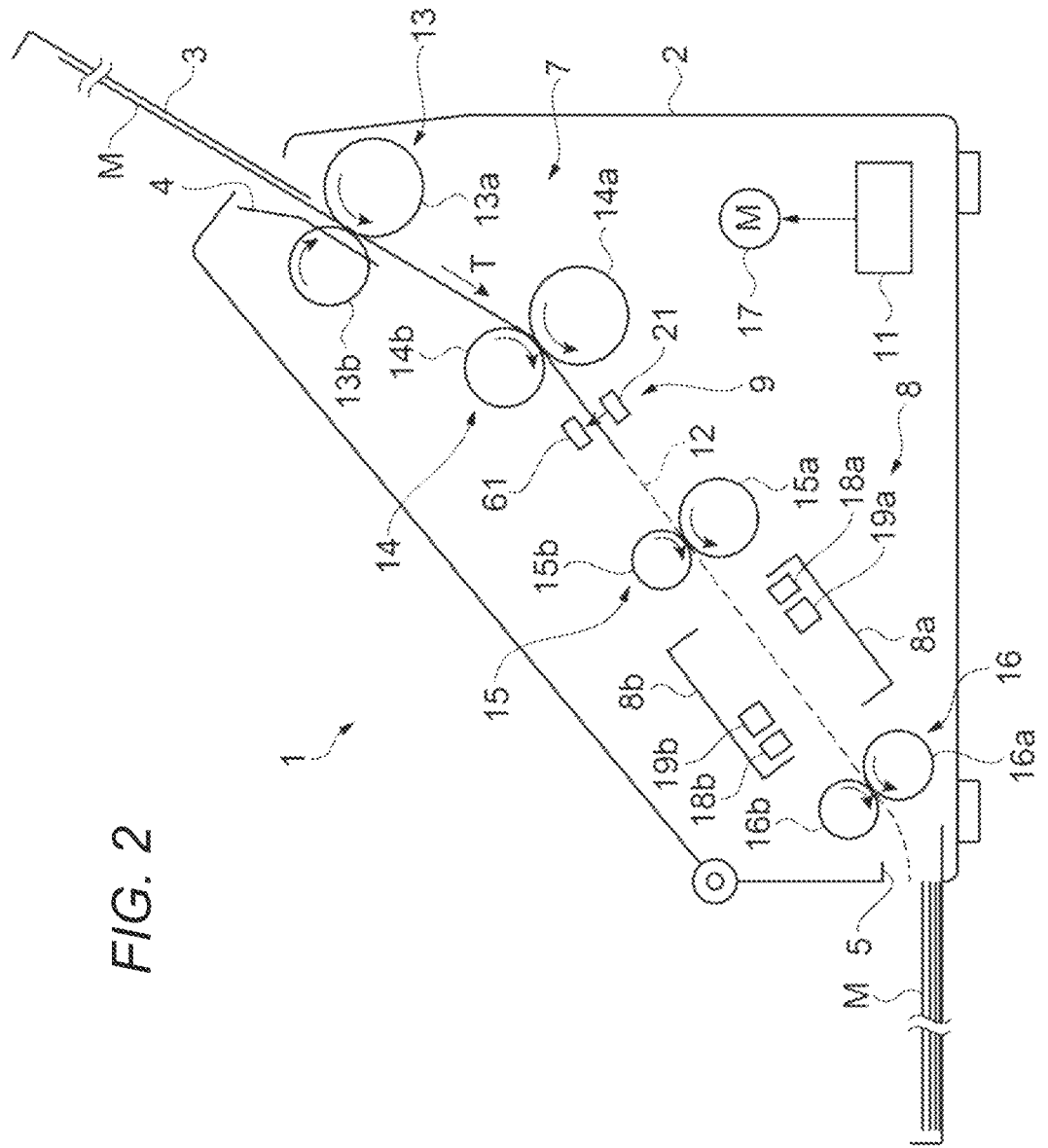
FIG. 2 shows a schematic configuration of the image scanner.

FIG. 2 shows a schematic configuration of the image scanner 1. FIG. 2 schematically shows the image scanner 1. The image scanner 1 has a transport mechanism 7, the reading unit 8, the ultrasonic sensor 9, and a control unit 11, inside the exterior 2.

The transport mechanism 7 transports the document M supplied from the supply port 4 into a direction of transport T toward the discharge port 5. The transport mechanism 7 transports the document M downward from above in the exterior 2. The document M is not limited to a paper. The document M may be formed of a film, a fabric or the like. The transport mechanism 7 transports the documents M placed on the document support 3, one by one. The transport mechanism 7 is equivalent to an example of a medium transport device. The transport mechanism 7 has the transport path 12, a first transport roller pair 13, a second transport roller pair 14, a third transport roller pair 15, and a fourth transport roller pair 16.

The transport path 12 is a movement path of the document M from the supply port 4 to the discharge port 5. The document M is transported from the supply port 4 to the discharge port 5 along the transport path 12. The first transport roller pair 13, the second transport roller pair 14, the third transport roller pair 15, and the fourth transport roller pair 16 are arranged along the transport path 12. The transport path 12 is equivalent to an example of a medium transport path.

The first transport roller pair 13 transports the document M supplied through the supply port 4, along the transport path 12. When a plurality of documents M are placed on the document support 3, the first transport roller pair 13 supplies the document M located at the top, of the plurality of documents M, into the transport path 12. The first transport roller pair 13 has a first drive roller 13*a* and a first driven roller 13*b*.

The first drive roller 13*a* transmits a drive force to transport the document M. The first drive roller 13*a* is driven to rotate by a drive force of a transport motor 17, described later. By being driven to rotate, the first drive roller 13*a* transports the document M along the transport path 12.

The first driven roller 13*b* comes into contact with the first drive roller 13*a*. As the first drive roller 13*a* is driven to rotate, the first driven roller 13*b* rotates with the rotation of the first drive roller 13*a*. The first driven roller 13*b*, together with the first drive roller 13*a*, holds the document M between these rollers and transports the document M along the transport path 12.

The second transport roller pair 14 is arranged downstream in the direction of transport T from the first transport roller pair 13. The second transport roller pair 14 transports the document M transported by the first transport roller pair 13, along the transport path 12. The second transport roller pair 14 functions as a separation mechanism that separates the documents M transported by the first transport roller pair 13 from one another. The second transport roller pair 14 has a second drive roller 14*a* and a second driven roller 14*b*.

The second drive roller 14*a* transmits a drive force to transport the document M. The second drive roller 14*a* is driven to rotate by the drive force of the transport motor 17. By being driven to rotate, the second drive roller 14*a* transports the document M along the transport path 12.

The second driven roller 14*b* comes into contact with the second drive roller 14*a*. As the second drive roller 14*a* is driven to rotate, the second driven roller 14*b* rotates with the rotation of the second drive roller 14*a*. The second driven roller 14*b*, together with the second drive roller 14*a*, holds the document M between these rollers and transports the document M along the transport path 12. The coefficient of friction of the outer circumferential surface of the second driven roller 14*b* to the document M is greater than the coefficient of friction of the outer circumferential surface of the second drive roller 14*a* to the document M. The documents M are separated from one another by the rotation of the second transport roller pair 14.

The third transport roller pair 15 is arranged downstream in the direction of transport T from the second transport roller pair 14. The third transport roller pair 15 transports the document M transported by the second transport roller pair 14, along the transport path 12. The third transport roller pair 15 has a third drive roller 15*a* and a third driven roller 15*b*.

The third drive roller 15*a* transmits a drive force to transport the document M. The third drive roller 15*a* is driven to rotate by the drive force of the transport motor 17. By being driven to rotate, the third drive roller 15*a* transports the document M along the transport path 12.

The third driven roller 15*b* comes into contact with the third drive roller 15*a*. As the third drive roller 15*a* is driven to rotate, the third driven roller 15*b* rotates with the rotation of the third drive roller 15*a*. The third driven roller 15*b*, together with the third drive roller 15*a*, holds the document M between these rollers and transports the document M along the transport path 12.

The fourth transport roller pair 16 is arranged downstream in the direction of transport T from the third transport roller pair 15. The fourth transport roller pair 16 transports the document M transported by the third transport roller pair 15, along the transport path 12. The fourth transport roller pair 16 transports the document M toward the discharge port 5. The fourth transport roller pair 16 has a fourth drive roller 16*a* and a fourth driven roller 16*b*.

The fourth drive roller 16*a* transmits a drive force to transport the document M. The fourth drive roller 16*a* is driven to rotate by the drive force of the transport motor 17. By being driven to rotate, the fourth drive roller 16*a* transports the document M along the transport path 12.

The fourth driven roller 16*b* comes into contact with the fourth drive roller 16*a*. As the fourth drive roller 16*a* is driven to rotate, the fourth driven roller 16*b* rotates with the rotation of the fourth drive roller 16*a*. The fourth driven roller 16*b*, together with the fourth drive roller 16*a*, holds the document M between these rollers and transports the document M along the transport path 12.

The reading unit 8 reads the document M transported along the transport path 12. The reading unit 8 is arranged along the transport path 12. In the image scanner 1 shown in FIG. 2, the reading unit 8 is arranged between the third transport roller pair 15 and the fourth transport roller pair 16. The reading unit 8 has a first scanner 8*a* and a second scanner 8*b*.

The first scanner 8*a* reads a first side of the document M transported along the transport path 12. The first scanner 8*a* is arranged at one side of the transport path 12 along the transport path 12. The first scanner 8*a* reads the first side of the document M and generates first read data. The first scanner 8*a* has a first light source 18*a* and a first image sensor 19*a*.

The first light source 18*a* casts light onto the first side of the document M. The first light source 18*a* is arranged at a position facing the first side of the document M. The first light source 18*a* casts light along a direction of document width orthogonal to the direction of transport T of the document M.

The first image sensor 19*a* receives light reflected from the first side of the document M. By receiving the light, the first image sensor 19*a* reads the first side of the document M. The first image sensor 19*a* is formed extending in the direction of document width.

The first scanner 8*a* casts the light from the first light source 18*a* onto the first side of the document M and receives the light reflected by the first side of the document M, with the first image sensor 19*a*. The first image sensor 19a receives the light reflected by the first side of the document M and thus reads the first side of the document M.

The second scanner 8b reads a second side of the document M transported along the transport path 12. The second side of the document M is the side opposite to the first side of the document M. The second scanner 8b is arranged at the other side of the transport path 12 along the transport path 12. The second scanner 8b may be provided at a position facing the first scanner 8a. The second scanner 8b reads the second side of the document M and generates second read data. The second scanner 8b has a second light source 18b and a second image sensor 19b.

The second light source 18b casts light onto the second side of the document M. The second light source 18b is arranged at a position facing the second side of the document M. The second light source 18b casts light along the direction of document width orthogonal to the direction of transport T of the document M. The configuration of the second light source 18b may be the same as or different from the configuration of the first light source 18a. Preferably, the configuration of the second light source 18b is the same as the configuration of the first light source 18a.

The second image sensor 19b receives light reflected from the second side of the document M. By receiving the light, the second image sensor 19b reads the second side of the document M. The second image sensor 19b is formed extending in the direction of document width. The configuration of the second image sensor 19b may be the same as or different from the configuration of the first image sensor 19a. Preferably, the configuration of the second image sensor 19b is the same as the configuration of the first image sensor 19a.

The second scanner 8b casts the light from the second light source 18b onto the second side of the document M and receives the light reflected by the second side of the document M, with the second image sensor 19b. The second image sensor 19b receives the light reflected by the second side of the document M and thus reads the second side of the document M.

The reading unit 8 has the first scanner 8a and the second scanner 8b. The reading unit 8 can read both sides of the document M. The reading unit 8 may read one side of the document M with one of the first scanner 8a and the second scanner 8b. The reading unit 8 has the first scanner 8a and the second scanner 8b but is not limited to this configuration. The reading unit 8 may be formed of one of the first scanner 8a and the second scanner 8b.

The ultrasonic sensor 9 detects multiple-sheet feeding of the documents M transported along the transport path 12. In the image scanner 1 shown in FIG. 2, the ultrasonic sensor 9 is arranged between the second transport roller pair 14 and the third transport roller pair 15. The ultrasonic sensor 9 is arranged along the transport path 12. The ultrasonic sensor 9 is used as a part of the configuration of the transport mechanism 7. The ultrasonic sensor 9 has a transmission unit 21 and a reception unit 61. The transmission unit 21 and the reception unit 61 are arranged at the opposite sides of the transport path 12. The ultrasonic sensor 9 is equivalent to an example of an ultrasonic device.

The transmission unit 21 transmits an ultrasonic wave. The transmission unit 21 transmits the ultrasonic wave toward the transport path 12. If the ultrasonic wave is transmitted when the document M that is transported is at a position facing the transmission unit 21, the ultrasonic wave passes through the document M and is transmitted to the reception unit 61. When the ultrasonic wave passes through the document M, the sound pressure of the ultrasonic wave is attenuated. The transmission unit 21 is equivalent to an example of an ultrasonic transmission unit.

The reception unit 61 receives an ultrasonic wave. The reception unit 61 receives the ultrasonic wave transmitted from the transmission unit 21 and passed through the transport path 12. If the ultrasonic wave is transmitted when the document M that is transported is at a position facing the transmission unit 21, the reception unit 61 receives the ultrasonic wave passed through the document M. The reception unit 61 generates a reception signal corresponding to the sound pressure of the ultrasonic wave. The reception unit 61 transmits the generated reception signal to the control unit 11. The reception unit 61 is equivalent to an example of an ultrasonic reception unit.

The transmission unit 21 and the reception unit 61 have the same or substantially the same configuration. The configuration of the transmission unit 21 and the reception unit 61 will be described later. The ultrasonic sensor 9 has the transmission unit 21 and the reception unit 61 but is not limited to this configuration. The transmission unit 21 may have the function of the reception unit 61. The transmission unit 21 receives the ultrasonic wave reflected from the document M. The transmission unit 21 generates a reception signal corresponding to the sound pressure of the received ultrasonic wave. The transmission unit 21 transmits the generated reception signal to the control unit 11. The arrangement of the transmission unit 21 and the reception unit 61 is not limited to the arrangement shown in FIG. 2. The transmission unit 21 may be arranged at the position of the reception unit 61 shown in FIG. 2. In this case, the reception unit 61 is arranged at the position of the transmission unit 21 shown in FIG. 2.

The control unit 11 is a controller that performs various kinds of control. In an example, the control unit 11 is a processor having a CPU (central processing unit). The control unit 11 may be formed of one or a plurality of processors. The control unit 11 may have a semiconductor memory such as a RAM (random-access memory) or a ROM (read-only memory). The semiconductor memory functions as a work area of the control unit 11. The control unit 11 executes a control program stored in a memory, not illustrated, and thus functions as various functional units.

The control unit 11 controls the drive of the transport motor 17 and thus controls the transport of the document M by the transport mechanism 7. The control unit 11 drives the transport motor 17 and thus causes the document M to be transported along the transport path 12. The control unit 11 controls the timing of starting the transport of the document M, the transport speed of the document M, the stop of the transport of the document M, and the like.

The control unit 11 controls the drive of the reading unit 8 and thus controls the reading of the document M. The control unit 11 causes the reading unit 8 to operate and thus causes the reading unit 8 to read the document M. The control unit 11 controls the timing of starting the reading of the document M, the timing of stopping the reading, single-side or double-side reading, and the like, of the reading unit 8.

The control unit 11 receives the reception signal outputted from the ultrasonic sensor 9. The control unit 11 detects multiple-sheet feeding of the documents M, based on the received reception signal. When the control unit 11 has detected the multiple-sheet feeding, the control unit 11 stops the transport of the document M. The control unit 11 controls the transport mechanism 7 and thus stops the transport of the document M.

The transport motor 17 generates a drive force to drive various drive rollers. The transport motor 17 transmits the generated drive force to the various drive rollers via a drive transmission mechanism, not illustrated. The transport motor 17 drives the first drive roller 13a, the second drive roller 14a, the third drive roller 15a, and the fourth drive roller 16a to rotate.

Figure 3:
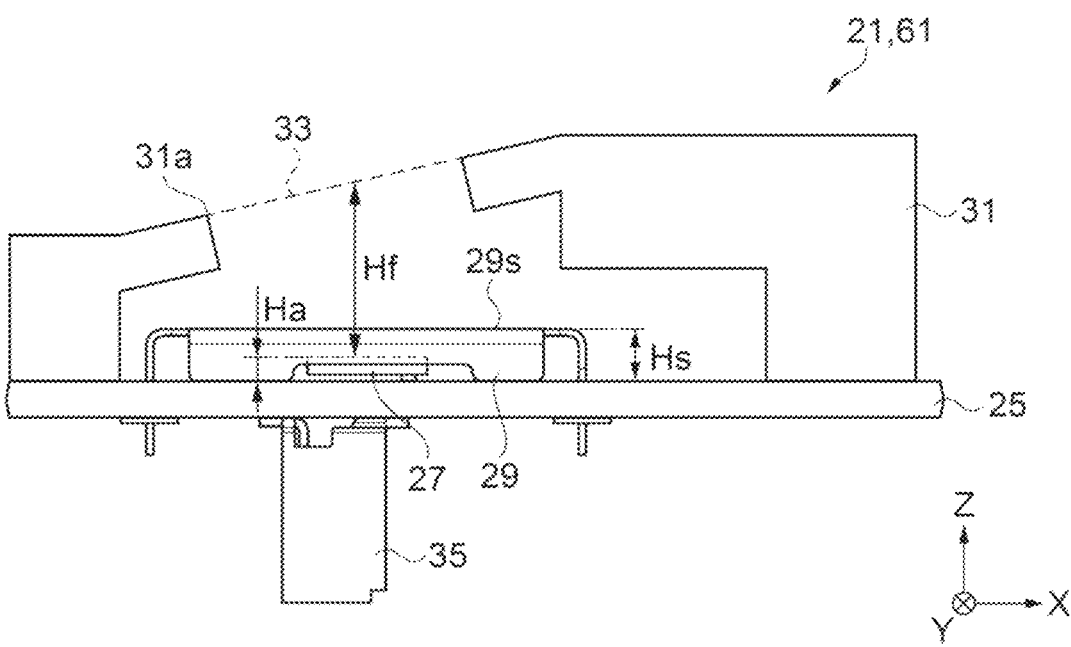
FIG. 3 shows a schematic configuration of a transmission unit.

FIG. 3 shows a schematic configuration of the transmission unit 21 of the ultrasonic sensor 9. The configuration of the transmission unit 21 shown in FIG. 3 may also be used as the configuration of the reception unit 61. FIG. 3 shows the transmission unit 21 as viewed from a −Y-direction. In FIG. 3, a surface in a +Y-direction and a surface in the −Y-direction of a holder 31 are omitted in order to make it easier to check the configuration of the transmission unit 21. The transmission unit 21 has a circuit board 25, an ultrasonic array 27, a wiring shield 29, the holder 31, a filter 33, and a connector 35.

A plurality of drawings including FIG. 3 show an XYZ coordinate system. A Z-axis is an axis parallel to the direction in which an ultrasonic wave is transmitted from the ultrasonic array 27. A +Z-direction is the direction in which the ultrasonic wave is transmitted. A −Z-direction is the direction opposite to the direction in which the ultrasonic wave is transmitted. An X-axis is an axis orthogonal to the Z-axis. The X-axis is an axis parallel to the long side of the circuit board 25. A +X-direction is a direction from left to right in FIG. 3. A −X-direction is a direction from right to left in FIG. 3. A Y-axis is an axis orthogonal to the Z-axis. The Y-axis is an axis parallel to the short side of the circuit board 25. A +Y-direction is a direction from front to back in FIG. 3. A −Y-direction is a direction from back to front in FIG. 3.

The circuit board 25 supports the ultrasonic array 27 and the wiring shield 29 with the surface in the +Z-direction. The circuit board 25 may support the holder 31 with the surface in the +Z-direction. The circuit board 25 is coupled to the connector 35 at the surface in the −Z-direction. The circuit board 25 is a rectangular plate member having long sides and short sides. The circuit board 25 supports an element wiring 37, described later, or the like, with the surface in the +Z-direction.

The ultrasonic array 27 transmits an ultrasonic wave from an array opening 27a. The array opening 27a is a part of the surface in the +Z-direction of the ultrasonic array 27. The array opening 27a is equivalent to an example of a transmission surface. Details of the array opening 27a will be described later. The ultrasonic array 27 transmits the ultrasonic wave in a direction intersecting the array opening 27a. The ultrasonic wave transmitted by the ultrasonic array 27 is a sound wave with a frequency of 100 kHz to 800 kHz. The frequency of the ultrasonic wave that is transmitted is suitably adjusted. When the reception unit 61 has the configuration shown in FIG. 3, the ultrasonic array 27 receives the ultrasonic wave. The ultrasonic array 27 is equivalent to an example of an ultrasonic element.

The ultrasonic array 27 is arranged at the surface in the +Z-direction of the circuit board 25. The array opening 27a of the ultrasonic array 27 is provided at a position at an array opening height Ha from the surface in the +Z-direction of the circuit board 25.

The wiring shield 29 covers the element wiring 37 arranged at the circuit board 25. The wiring shield 29 covers the element wiring 37 and thus shields the element wiring 37. The wiring shield 29 is arranged at the surface in the +Z-direction of the circuit board 25. The wiring shield 29 is arranged at the outer circumference of the ultrasonic array 27.

The wiring shield 29 has a wiring shield surface 29s. The wiring shield surface 29s is provided at a position at a wiring shield height Hs from the surface in the +Z-direction of the circuit board 25. The wiring shield height Hs is higher than the array opening height Ha. As the wiring shield surface 29s is provided at the position at the wiring shield height Hs, the wiring shield 29 functions as a protection cover that protects the ultrasonic array 27. The transmission unit 21 can be assembled by a worker. The wiring shield 29 can reduce the contact by the worker with the ultrasonic array 27. The wiring shield 29 is equivalent to an example of a shield. Preferably, the wiring shield height Hs is close to the array opening height Ha. As the wiring shield height Hs becomes lower, a noise of a multiple reflection component due to the wiring shield 29 is restrained.

The holder 31 supports the filter 33. The holder 31 is arranged at the outer circumference of the wiring shield 29 at the top of the circuit board 25. The holder 31 is formed in a shape that covers the outer circumference of the wiring shield 29. The holder 31 is formed as a separate component from the wiring shield 29. The holder 31 is formed extending in the direction of the ultrasonic wave. The holder 31 is formed with a predetermined height in the +Z-direction. The holder 31 is provided with a holder opening 31a. The holder opening 31a is provided at a position in the +Z-direction that faces the ultrasonic array 27. The holder 31 is equivalent to an example of a holder. The holder opening 31a is equivalent to an example of a holder opening. The outer circumference of the wiring shield 29 is equivalent to an example of a shield outer circumference.

The filter 33 protects the ultrasonic array 27. The filter 33 is supported by the holder 31. The filter 33 is provided at the holder opening 31a. The filter 33 is formed facing the surface in the +Z-direction of the ultrasonic array 27. The filter 33 is arranged at a position facing the array opening 27a of the ultrasonic array 27 in the direction of the ultrasonic wave. The filter 33 has a hole through which the ultrasonic wave passes. Details of the filter 33 will be described later. The filter 33 is equivalent to an example of a protector.

The filter 33 is arranged tilting in relation to the array opening 27a of the ultrasonic array 27. As the filter 33 is arranged tilting in relation to the array opening 27a of the ultrasonic array 27, a noise based on a multiple reflection component of the ultrasonic wave due to the filter 33 is restrained.

The filter 33 is provided at a position at a filter height Hf along the Z-axis from the center of the array opening 27a of the ultrasonic array 27. The filter height Hf can be suitably set according to the shape of the holder 31. When an ultrasonic wave is transmitted from the ultrasonic array 27, a noise based on a multiple reflection component due to the filter 33 is generated. If the filter height Hf is lower than a predetermined height, the noise based on the multiple reflection component due to the filter 33 is superimposed on the reception signal. The reception signal is a signal received by the reception unit 61. The noise based on the multiple reflection component due to the filter 33 causes a drop in the accuracy of the reception signal. If the filter height Hf is higher than the predetermined height, the reception signal and the noise based on the multiple reflection component due to the filter are separated from each other. The drop in the accuracy of the reception signal is thus restrained. Since the filter height Hf is suitably set according to the shape of the holder 31, the noise based on the multiple reflection component due to the filter 33 can be separated from the reception signal. The drop in the accuracy of the reception signal is thus restrained.

The connector 35 is configured to be able to couple the transmission unit 21 to the image scanner 1. The connector 35 is coupled to the circuit board 25 at the surface in the −Z-direction of the circuit board 25. The connector 35 transmits a control signal or the like transmitted from the control unit 11, to the ultrasonic array 27. The connector 35 supplies electric power from a power supply, not illustrated, to the ultrasonic array 27. The connector 35 transmits a signal generated by the ultrasonic array 27 to the control unit 11.

Figure 4:
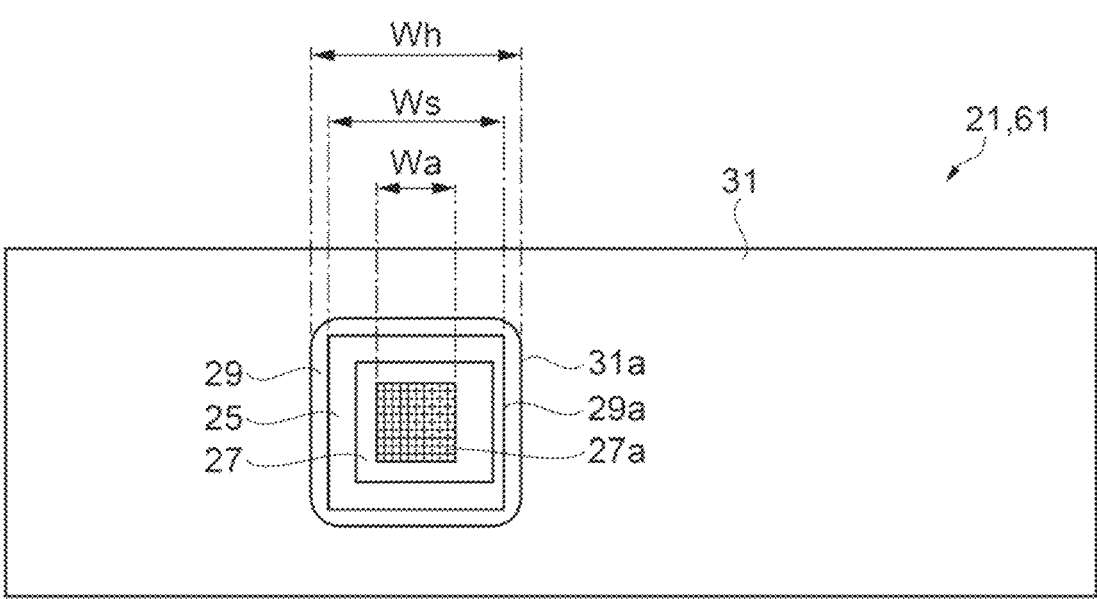
FIG. 4 shows a schematic configuration of the transmission unit.
Figure 4:
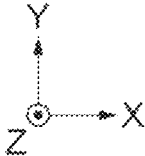

FIG. 4 shows a schematic configuration of the transmission unit 21. FIG. 4 shows the transmission unit 21 as viewed from the +Z-direction. The configuration of the transmission unit 21 shown in FIG. 4 may also be used as the configuration of the reception unit 61. In FIG. 4, the filter 33 is omitted.

The holder 31 covers the surface in the +Z-direction of the circuit board 25. The holder opening 31a provided in the holder 31 is configured in such a way that the array opening 27a is visible through the holder opening 31a from the +Z-direction. The shape of the holder opening 31a shown in FIG. 4 is a quadrilateral but is not limited to this shape. The holder opening 31a is not limited to any particular shape, provided that an ultrasonic wave can pass through the holder opening 31a. The holder opening 31a is provided at a position facing the array opening 27a along the +Z-axis. The holder opening 31a shown in FIG. 4 is an opening having a width that is defined as a holder opening width Wh, along the X-axis and the Y-axis.

The ultrasonic array 27 has the array opening 27a through which to transmit an ultrasonic wave, at the surface in the +Z-direction. The array opening 27a shown in FIG. 4 is an opening having a width that is defined as an array opening width Wa, along the X-axis and the Y-axis. The array opening width Wa is shorter than the holder opening width Wh. The holder opening 31a is configured to be broader than the array opening 27a. Since the holder opening 31a is configured to be broader than the array opening 27a, the noise based on the multiple reflection component due to the holder 31 is reduced.

The wiring shield 29 is provided with a wiring shield opening 29a. The wiring shield opening 29a is equivalent to an example of a shield opening. The wiring shield opening 29a is provided at a position facing the array opening 27a along the +Z-axis. The wiring shield opening 29a shown in FIG. 4 is an opening having a width that is defined as a wiring shield opening width Ws, along the X-axis and the Y-axis. The wiring shield opening width Ws is broader than the array opening width Wa. The wiring shield opening 29a is configured to be broader than the array opening 27a. Since the wiring shield opening 29a is configured to be broader than the array opening 27a, the noise based on the multiple reflection component due to the wiring shield 29 is reduced.

The wiring shield opening 29a is provided at a position facing the holder opening 31a along the +Z-axis. The wiring shield opening width Ws is narrower than the holder opening width Wh. The holder opening 31a is configured to be broader than the wiring shield opening 29a. Since the holder opening 31a is configured to be broader than the wiring shield opening 29a, the noise based on the multiple reflection component due to the holder 31 is reduced.

The holder opening 31a is broader than the array opening 27a and the wiring shield opening 29a. The noise based on the multiple reflection component due to the holder 31 and the noise based on the multiple reflection component due to the wiring shield 29 are thus restrained.

Figure 5:
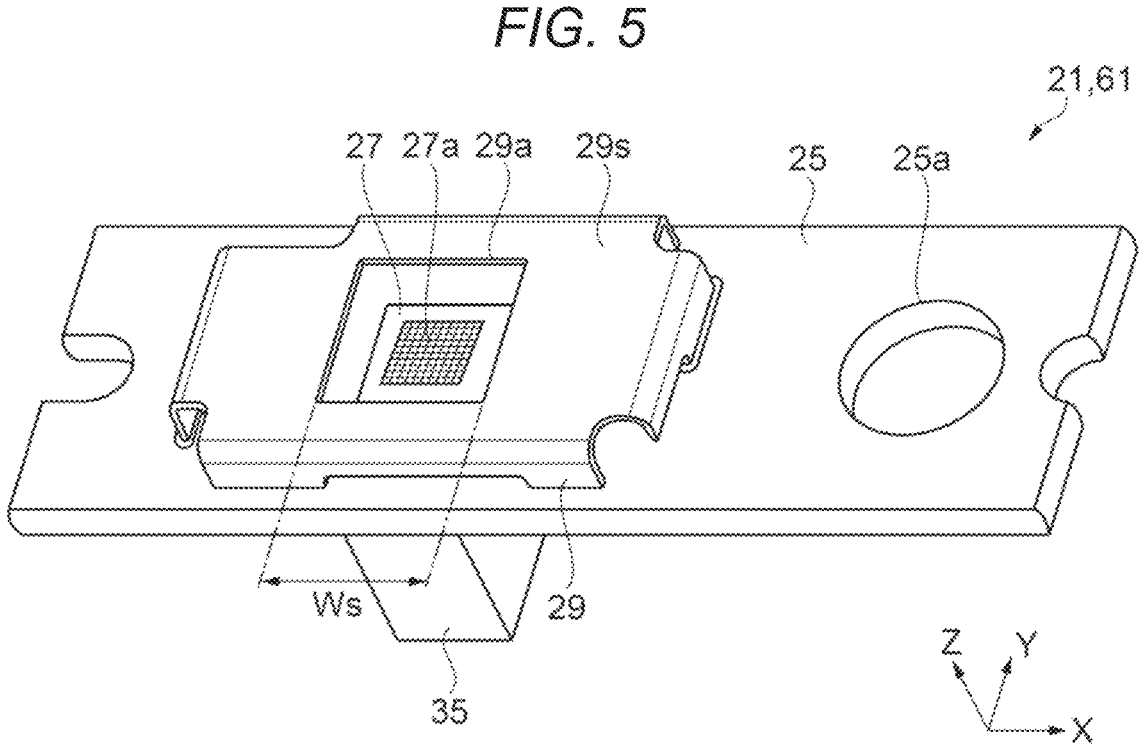
FIG. 5 shows the relationship between an ultrasonic array and a wiring shield.

FIG. 5 shows the relationship between the ultrasonic array 27 and the wiring shield 29. In FIG. 5, the holder 31 is omitted. FIG. 5 shows a perspective view of the transmission unit 21 except the holder 31.

The circuit board 25 has a first hole 25a. The first hole 25a is a hole penetrating the circuit board 25. The first hole 25a is used to attach the transmission unit 21 to the image scanner 1.

The wiring shield 29 is arranged at the outer circumference of the array opening 27a of the ultrasonic array 27. The wiring shield surface 29s of the wiring shield 29 is provided at a position in the +Z-direction in relation to the array opening 27a. The wiring shield surface 29s is arranged at a position more into the direction than the array opening 27a. The wiring shield opening width Ws is formed in a dimension that does not allow easy entry of a finger or a tool of the worker assembling the transmission unit 21. The wiring shield opening width Ws is formed to be approximately several centimeters. The wiring shield 29 functions as a protection cover at the time of assembly.

The wiring shield 29 is arranged at a position more into the direction than the array opening 27a. The wiring shield opening 29a is broader than the array opening 27a.

The wiring shield 29 functions as a protection cover that prevents the worker or the tool from coming into contact with the ultrasonic array 27 when assembling the transmission unit 21. Since the wiring shield opening 29a is formed to be broader than the array opening 27a, the noise based on the multiple reflection component due to the wiring shield 29 is restrained.

Figure 6:
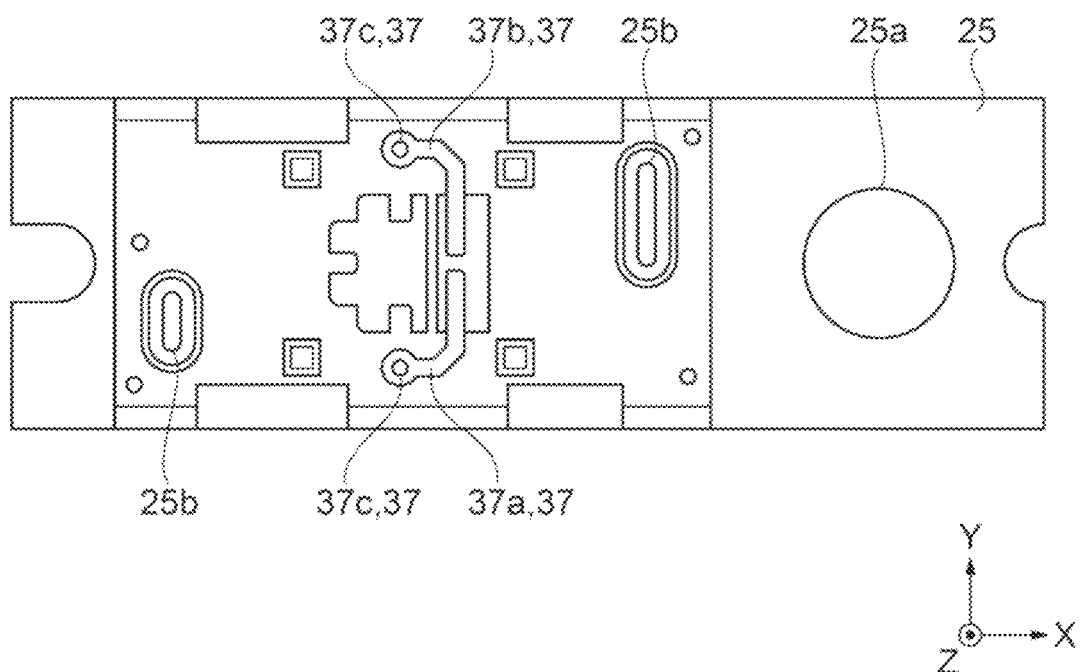
FIG. 6 shows a schematic configuration of a circuit board.

FIG. 6 shows a schematic configuration of the circuit board 25. FIG. 6 shows a state where the holder 31, the wiring shield 29, and the ultrasonic array 27 are removed. FIG. 6 shows the element wiring 37 arranged at the circuit board 25. The element wiring 37 is covered by the wiring shield 29.

The element wiring 37 supplies electric power or a signal to the ultrasonic array 27. The element wiring 37 is arranged at the outer circumference of the array opening 27a. The element wiring 37 is a wiring coupled to the ultrasonic array 27. The element wiring 37 has a first element wiring 37a, a second element wiring 37b, and a third element wiring 37c. The element wiring 37 is equivalent to an example of a wiring.

The first element wiring 37a transmits a control signal to the ultrasonic array 27. The control signal is transmitted from the control unit 11 to the ultrasonic array 27. The control signal is a signal that controls the operation of the ultrasonic array 27. The second element wiring 37b is a grounding line. The third element wiring 37c is a through-hole. The connector 35 and the ultrasonic array 27 are coupled together via the third element wiring 37c. The first element wiring 37a, the second element wiring 37b, and the third element wiring 37c are shielded by the wiring shield 29.

Figure 7:
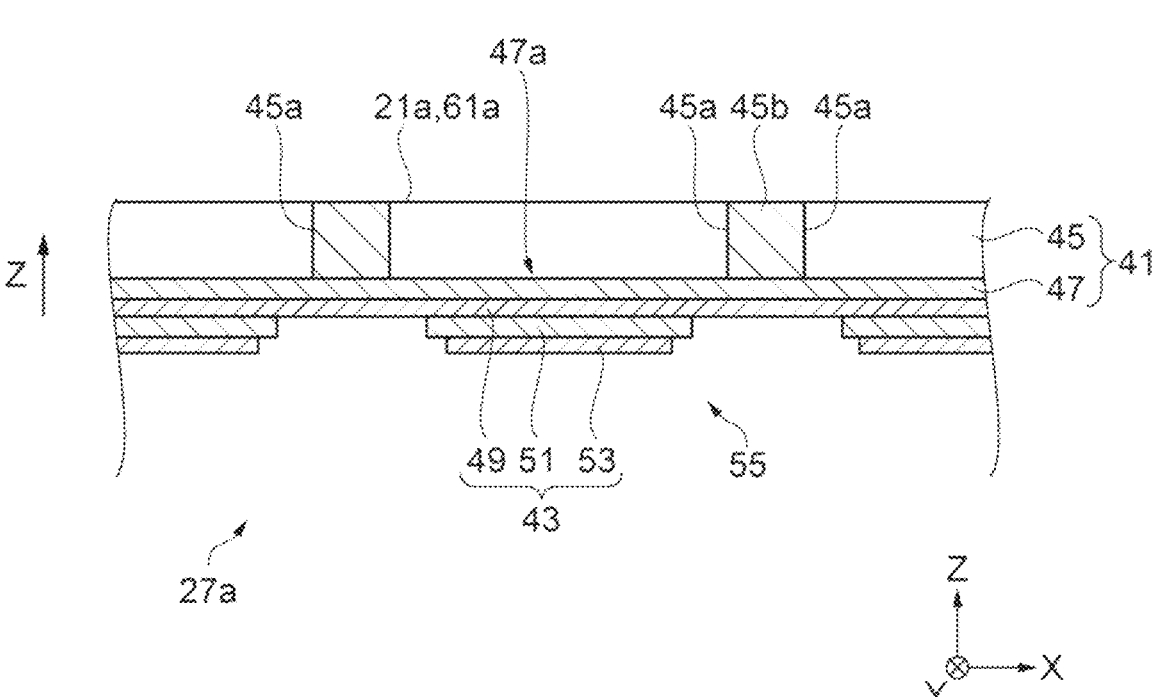
FIG. 7 shows a schematic configuration of an array opening.

FIG. 7 shows a schematic configuration of the array opening 27a. FIG. 7 shows a part of the array opening 27a in an enlarged view. When the ultrasonic array 27 is arranged in the transmission unit 21, the array opening 27a transmits an ultrasonic wave. When the ultrasonic array 27 is arranged in the reception unit 61, the array opening 27a receives an ultrasonic wave. The array opening 27a has an element substrate 41 and a piezoelectric element 43. The element substrate 41 and the piezoelectric element 43 are arranged along the Z-axis.

The element substrate 41 transmits or receives an ultrasonic wave. The surface in the +Z-direction of the element substrate 41 functions as a transmission part 21a or a reception part 61a. The transmission part 21a is a part that transmits an ultrasonic wave in the transmission unit 21. The reception part 61a is a part that receives an ultrasonic wave in the reception unit 61. The element substrate 41 has a substrate main body 45 and a vibration plate 47. The substrate main body 45 and the vibration plate 47 are arranged along the Z-axis. The vibration plate 47 is arranged in the −Z-direction of the substrate main body 45.

The substrate main body 45 is formed of a semiconductor substrate of Si or the like. The substrate main body 45 supports the vibration plate 47 arranged in the −Z-direction. The substrate main body 45 has a plurality of openings 45a and a partition wall 45b.

The plurality of openings 45a are provided along the X-axis and the Y-axis. The opening 45a penetrates the substrate main body 45. The plurality of openings 45a are demarcated by the partition wall 45b. The opening 45a opens in the +Z-direction. The surface in the −Z-direction of the opening 45a is formed by the vibration plate 47. The opening 45a exposes the vibration plate 47.

The partition wall 45b demarcates the plurality of openings 45a. The partition wall 45b supports the vibration plate 47. The partition wall 45b is a member extending along the X-axis and the Y-axis. The partition wall 45b is formed with a predetermined height along the Z-axis.

The vibration plate 47 vibrates and thus transmits an ultrasonic wave, or receives an ultrasonic wave. The vibration plate 47 is arranged at a position in the −Z-direction of the substrate main body 45. The vibration plate 47 is formed of a multilayer body of $SiO_2$ and $ZrO_2$, or the like. The vibration plate 47 is supported by the partition wall 45b of the substrate main body 45. A vibration surface 47a, which is the surface in the +Z-direction of the vibration plate 47, forms the surface in the −Z-direction of the opening 45a.

The piezoelectric element 43 causes the vibration plate 47 to vibrate and transmit an ultrasonic wave. Alternatively, when the vibration plate 47 receives an ultrasonic wave and vibrates, the piezoelectric element 43 converts the vibration into a signal. A plurality of piezoelectric elements 43 are provided at the surface in the −Z-direction of the vibration plate 47. The piezoelectric element 43 is arranged at a position in the −Z-direction of the opening 45a. The piezoelectric element 43 has a first electrode 49, a piezoelectric film 51, and a second electrode 53. The first electrode 49 is arranged at the surface in the −Z-direction of the vibration plate 47. The first electrode 49, the piezoelectric film 51, and the second electrode 53 are stacked in this order at the surface in the −Z-direction of the vibration plate 47. The vibration plate 47 and one piezoelectric element 43 together form an ultrasonic transducer 55.

The ultrasonic transducer 55 converts an electrical signal into an ultrasonic wave. Alternatively, the ultrasonic transducer 55 converts an ultrasonic wave into an electrical signal. When the ultrasonic array 27 having the array opening 27a is provided in the transmission unit 21, the ultrasonic transducer 55 converts an electrical signal into an ultrasonic wave and transmits the ultrasonic wave. When the ultrasonic array 27 having the array opening 27a is provided in the reception unit 61, the ultrasonic transducer 55 receives an ultrasonic wave and converts the ultrasonic wave into an electrical signal. A plurality of ultrasonic transducers 55 are arranged in a two-dimensional array structure and thus form the array opening 27a.

The first electrode 49 is a common electrode coupled to the plurality of piezoelectric elements 43. The first electrode 49 is provided at the surface in the −Z-direction of the vibration plate 47. The first electrode 49 transmits an electrical signal to the piezoelectric films 51 of the plurality of piezoelectric elements 43. Alternatively, the first electrode 49 receives an electrical signal from the piezoelectric films 51 of the plurality of piezoelectric elements 43.

The piezoelectric film 51 expands and contracts in response to an electrical signal. When a pulse voltage with a predetermined frequency is applied between the first electrode 49 and the second electrode 53, the piezoelectric film 51 expands and contracts. Due to the expansion and contraction of the piezoelectric film 51, the vibration surface 47a vibrates at a frequency corresponding to the opening width of the opening 45a, or the like. The ultrasonic transducer 55 transmits an ultrasonic wave in the +Z-direction. The piezoelectric film 51 expands and contracts and thus transmits an ultrasonic wave.

Alternatively, the piezoelectric film 51 expands and contracts when receiving an ultrasonic wave. The piezoelectric film 51 expands and contracts and thus converts the ultrasonic wave into an electrical signal. The ultrasonic transducer 55 receives an ultrasonic wave transmitted in the −Z-direction. When the vibration plate 47 receives the ultrasonic wave, the piezoelectric film 51 vibrates. When the piezoelectric film 51 vibrates, a potential difference is generated between the first electrode 49 and the second electrode 53. The piezoelectric element 43 generates an electrical signal corresponding to the potential difference. The generated electrical signal is outputted as a reception signal to the control unit 11.

Figure 8:
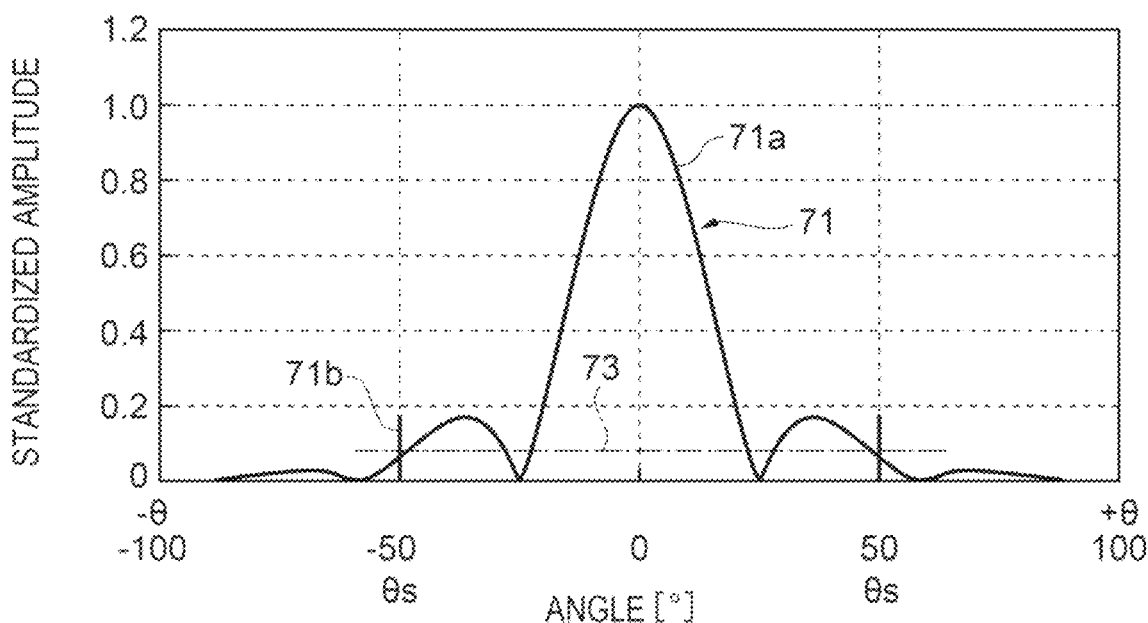
FIG. 8 shows a distribution of output of an ultrasonic wave transmitted from the ultrasonic array.

FIG. 8 shows a distribution of output of an ultrasonic wave transmitted from the ultrasonic array 27. FIG. 8 shows the directivity of the ultrasonic wave. On the horizontal axis in FIG. 8, an angle of transmission θ of an ultrasonic wave passing through the center of the array opening 27a and transmitted parallel to the Z-axis is defined as 0°. The angle shown on the horizontal axis represents the angle of transmission θ of an ultrasonic wave transmitted through the array opening 27a in relation to an axis parallel to the Z-axis. In an example, the +sign attached to the angle represents the +X-direction. The −sign attached to the angle represents the −X-direction. The vertical axis in FIG. 8 represents the intensity of the ultrasonic wave. On the vertical axis, the intensity of an ultrasonic wave transmitted at an angle of transmission θ of 0° is standardized to be 1.0.

FIG. 8 shows an output distribution curve 71 of the ultrasonic wave transmitted from the ultrasonic array 27. The output distribution curve 71 shows that the intensity of the ultrasonic wave varies depending on the angle of transmission θ of the ultrasonic wave. The ultrasonic wave transmitted from the ultrasonic array 27 has a high directivity when the angle of transmission θ is 0°. The ultrasonic wave transmitted from the ultrasonic array 27 is shown to have a directivity in the +Z-direction. The output distribution curve 71 shows a main lobe 71a and a side lobe 71b.

The main lobe 71a shows a main peak of the ultrasonic wave. The main lobe 71a shows a peak corresponding to the angle of transmission of 0° at its center. The main lobe 71a shows that the intensity of the ultrasonic wave is the highest when the angle of transmission θ is 0°.

The side lobe 71b shows a peak of the intensity of the ultrasonic wave next to the main lobe 71a. The side lobe 71b occurs over a broader angle of transmission θ than the main lobe 71a. The side lobe 71b is a contributing factor to the occurrence of a noise.

FIG. 8 shows a side lobe half value 73 indicating a half value of the peak intensity of the side lobe 71b. In FIG. 8, a side lobe half-value angle θs corresponding to the side lobe half value 73 is +50° and −50°. The side lobe half value 73 can be suitably calculated, based on the structure of the array opening 27a.

Figure 9:
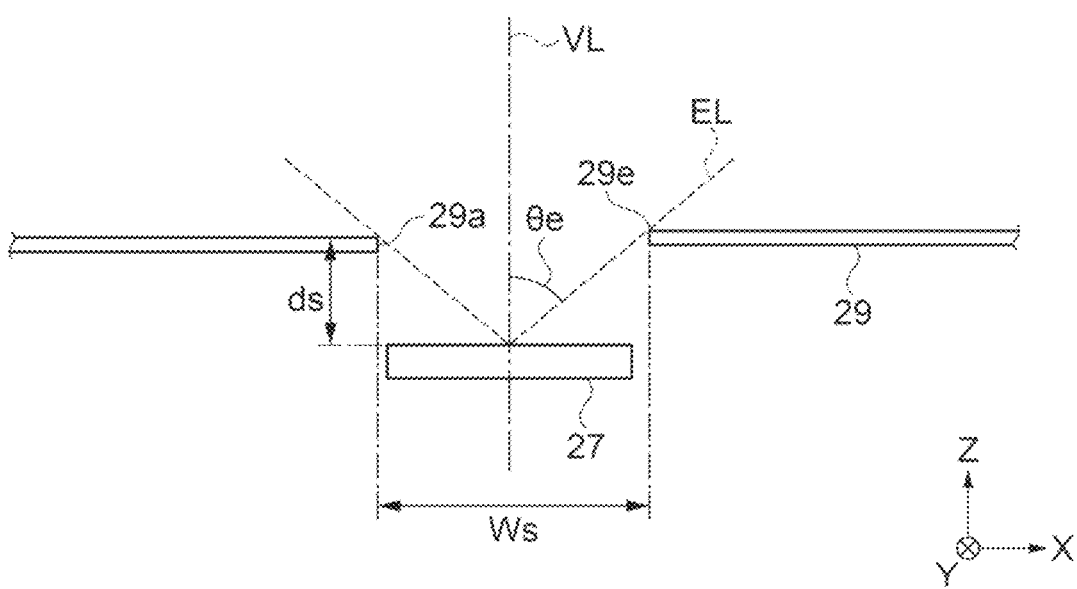
FIG. 9 shows the relationship between the ultrasonic array and the wiring shield.

FIG. 9 shows the relationship between the ultrasonic array 27 and the wiring shield 29. FIG. 9 shows the positional relationship between the ultrasonic array 27 and the wiring shield opening 29a. FIG. 9 shows a vertical line VL, an imaginary line EL, an edge angle θe, and an inter-member distance ds.

The vertical line VL is a perpendicular line passing through the center of the array opening 27a. The vertical line VL corresponds to the position where the angle of transmission is 0° shown in FIG. 8.

The imaginary line EL is an imaginary line connecting the center of the array opening 27a and a wiring shield opening edge 29e. The wiring shield opening edge 29e is the edge of the wiring shield opening 29a. The wiring shield opening edge 29e is the edge of the surface in the +Z-direction of the wiring shield 29.

The edge angle θe is the angle between the imaginary line EL and the vertical line VL. The edge angle θe corresponds to the angle of transmission θ of the ultrasonic wave. An ultrasonic wave having an angle of transmission θ smaller than the edge angle θe passes through the wiring shield opening 29a. An ultrasonic wave having an angle of transmission θ greater than the edge angle θe is reflected by the surface in the −Z-direction of the wiring shield 29. The reflected ultrasonic wave becomes a noise and reduces the sensitivity of the ultrasonic sensor 9.

Preferably, the edge angle θe is broader than the side lobe half-value angle θs. If the edge angle θe is broader than the side lobe half-value angle θs, the intensity of the ultrasonic wave reflected by the surface in the −Z-direction of the wiring shield 29 decreases. As the intensity of the ultrasonic wave decreases, the influence of the noise is reduced. In the ultrasonic sensor 9, a drop in the measurement accuracy due to the influence of the noise can thus be restrained.

The inter-member distance ds is the distance between the surface in the +Z-direction of the ultrasonic array 27 and the surface in the +Z-direction of the wiring shield 29. If the inter-member distance ds becomes shorter, the edge angle θe becomes greater and the reflection of the ultrasonic wave by the surface in the −Z-direction of the wiring shield 29 decreases. If the inter-member distance ds becomes longer, the contact with the ultrasonic array 27 by the worker decreases. The wiring shield opening width Ws of the wiring shield opening 29a is 2×ds×tan θe. Preferably, the wiring shield opening width Ws is expressed by the following formula(1):

$$Ws \geq 2 \times ds \times \tan \theta s \qquad (1).$$

If the wiring shield opening width Ws is in the relation expressed by the formula (1), the intensity of the ultrasonic wave reflected by the surface in the −Z-direction of the wiring shield 29 drops. As the intensity of the ultrasonic wave drops, the influence of the noise decreases. In the ultrasonic sensor 9, a drop in the measurement accuracy due to the influence of the noise can thus be restrained.

Preferably, the edge angle θe between the imaginary line EL connecting the wiring shield opening edge 29e, which is the edge of the wiring shield opening 29a, and the center of the array opening 27a, and the vertical line VL in the array opening 27a passing through the center of the array opening 27a, is broader than the side lobe half-value angle θs corresponding to the half value of the side roble 71b of the ultrasonic wave transmitted from the array opening 27a.

The reflection by the wiring shield 29 of the ultrasonic wave forming the side lobe 71b is restrained. In the ultrasonic sensor 9, a drop in the detection accuracy is thus restrained.

Figure 10:
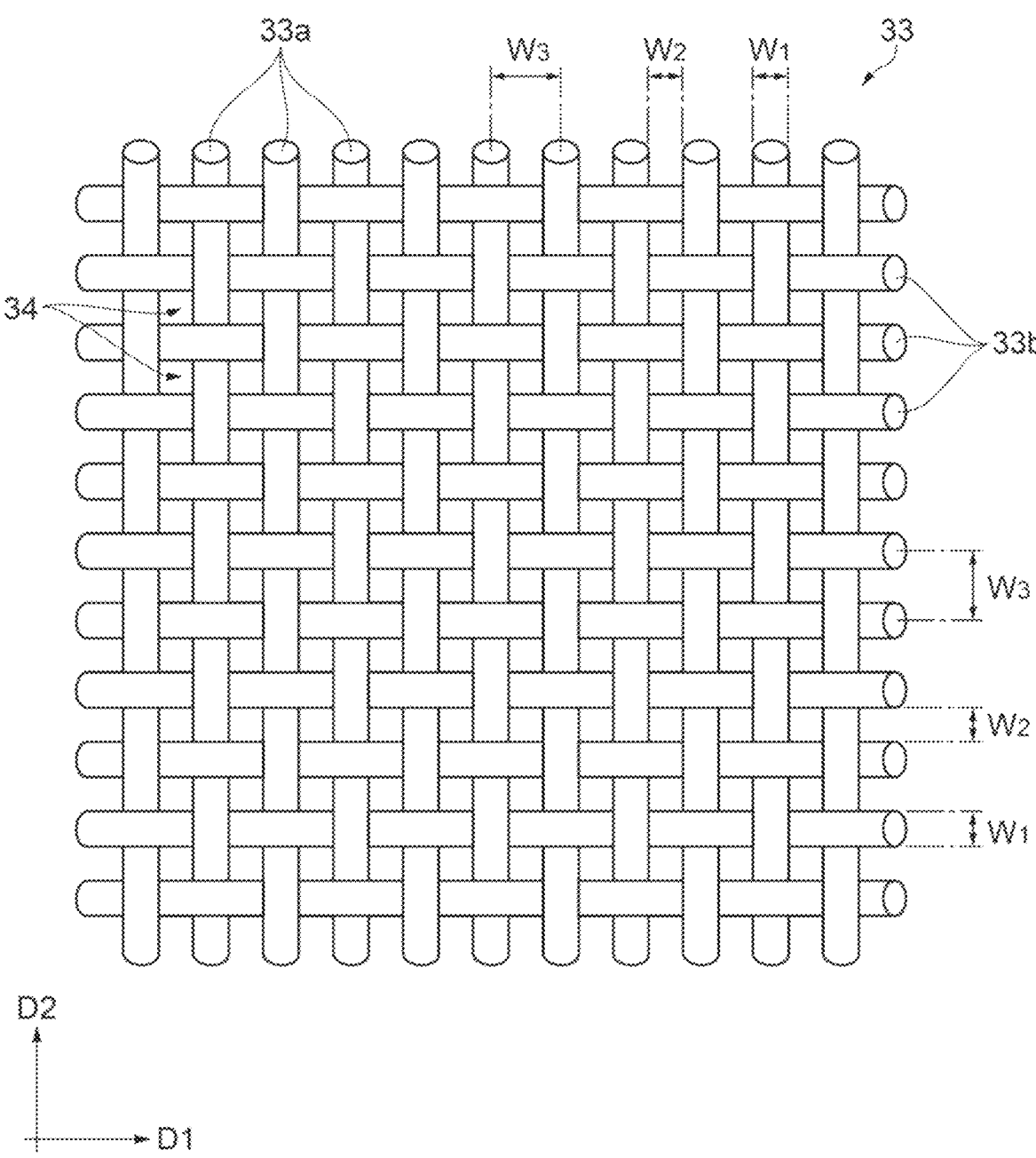
FIG. 10 shows a schematic configuration of a filter.

FIG. 10 shows a schematic configuration of the filter 33. FIG. 10 shows the filter 33 in an enlarged view. FIG. 10 shows a first direction D1 and a second direction D2. The first direction D1 and the second direction D2 are orthogonal to each other. The filter 33 has a plurality of first wires 33a and a plurality of second wires 33b.

The first wire 33a extends along the second direction D2. The first wire 33a is a member with a wire diameter W1. The plurality of first wires 33a are arranged along the first direction D1. The plurality of first wires 33a are arranged at a pitch W3.

The second wire 33b extends along the first direction D1. The second wire 33b is a member with the wire diameter W1. The plurality of second wires 33b are arranged along the second direction D2. The plurality of second wires 33b are arranged at the pitch W3.

The first wire 33a and the second wire 33b are formed of members with the wire diameter W1 but are not limited to this configuration. The first wire 33a and the second wire 33b may be formed of members with different diameters from each other. The plurality of first wires 33a and the plurality of second wires 33b are arranged at the pitch W3 but are not limited to this configuration. The space between the plurality of first wires 33a and the space between the plurality of second wires 33b may be different from each other.

Preferably, the wire diameter W1 of the first wire 33a and the second wire 33b is less than the wavelength of the ultrasonic wave. As the wire diameter W1 is configured to be less than the wavelength of the ultrasonic wave, diffused reflection of the ultrasonic wave by the first wire 33a and the second wire 33b is restrained.

The first wire 33a and the second wire 33b are formed of a metal material such as copper, iron, brass or SUS, an alloy material, a synthetic resin such as nylon or polyester, or the like. Preferably, the first wire 33a and the second wire 33b are formed of an electrically conductive material. The first wire 33a and the second wire 33b can be resistant to static electricity and electromagnetic waves.

The filter 33 is in the form of a mesh of the first wire 33a and the second wire 33b. The first wire 33a and the second wire 33b are formed, intersecting each other at an angle of 90°, but are not limited to this configuration. The first wire 33a and the second wire 33b may be arranged, intersecting at an angle other than 90°.

A filter opening 34 is formed by the first wire 33a and the second wire 33b. The filter opening 34 is formed by the first wires 33a next to each other and the second wires 33b next to each other. The filter opening 34 is formed with an opening size W2. The opening size W2 is the space between the first wires 33a next to each other. The opening size W2 is the space between the second wires 33b next to each other. Preferably, the opening size W2 is 1 mm or less. If the opening size W2 is configured to be 1 mm or less, the probability of foreign matters adhering to the ultrasonic array 27 drops. The filter opening 34 allows the passage of the ultrasonic wave. The filter opening 34 is equivalent to an example of a hole.

The porosity S of the filter 33 is calculated by the following formula (2):

$$S=100\times(W2/W3)^2 \tag{2}$$

Preferably, the porosity S is 20% or higher. The porosity S represents the area rate of the filter opening 34 in the filter 33. When the porosity S is less than 20%, the acoustic transmission rate of the filter 33 is less than 50%. The acoustic transmission rate is the rate at which a sound wave passes through the filter 33. When the acoustic transmission rate is less than 50%, the detection sensitivity of the ultrasonic sensor 9 drops. It becomes difficult for the ultrasonic sensor 9 to detect multiple-sheet feeding of the documents M or the like that occurs in the image scanner 1. When the porosity S is 20% or higher, the acoustic transmission rate of the filter 33 is 50% or higher. An excessive drop in the sound pressure by the filter 33 can be restrained and a drop in the sensitivity of the detection of multiple-sheet feeding or the like by the ultrasonic sensor 9 is restrained.

The ultrasonic sensor 9 has the ultrasonic array 27 having the array opening 27*a* that transmits an ultrasonic wave and transmitting the ultrasonic wave in the direction intersecting the array opening 27*a*, the element wiring 37 arranged at the outer circumference of the array opening 27*a* and coupled to the ultrasonic array 27, the wiring shield 29 covering the element wiring 37, the holder 31 arranged at the outer circumference of the wiring shield 29 and extending in the direction, and the filter 33 facing the array opening 27*a* and having the filter opening 34 through which the ultrasonic wave passes. The wiring shield 29 is provided with the wiring shield opening 29*a* facing the array opening 27*a*. The holder 31 is provided with the holder opening 31*a* facing the array opening 27*a*. The filter 33 is arranged at the holder opening 31*a*.

As the filter 33 is arranged at the holder 31, the distance between the wiring shield 29 and the ultrasonic array 27 and the position of the filter 33 can be separately set. The ultrasonic sensor 9 in which a drop in the detection accuracy is restrained since the noise based on the multiple reflection component of the ultrasonic wave due to the holder 31 and the noise based on the multiple reflection component of the ultrasonic wave due to the wiring shield 29 are not easily generated, can be designed.

First Embodiment

Figures 11, 12:
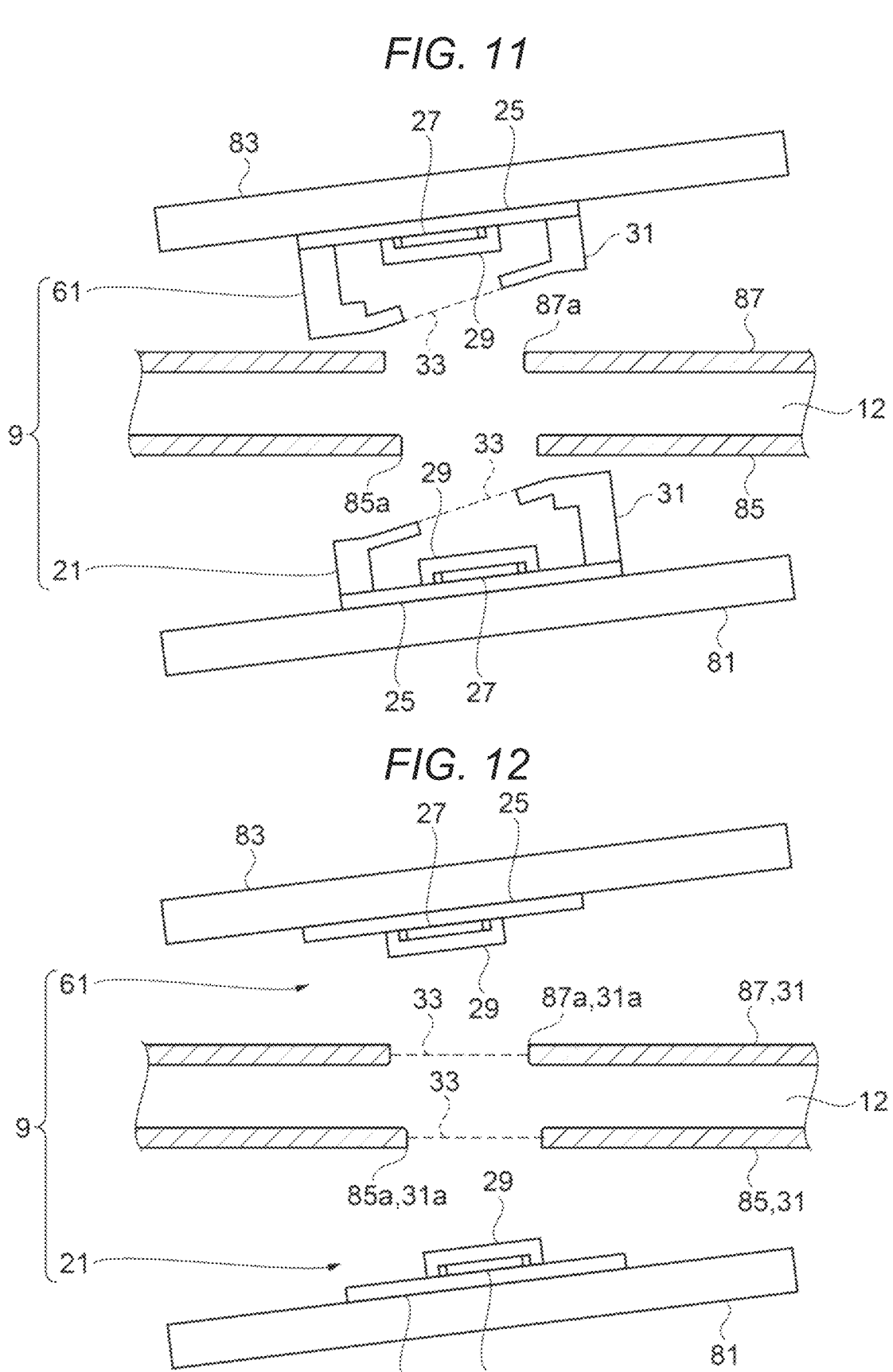
FIG. 11 shows a schematic configuration of the peripheries of an ultrasonic sensor.
FIG. 12 shows a schematic configuration of the peripheries of the ultrasonic sensor.

A first embodiment represents the image scanner 1 where the ultrasonic sensor 9 including the transmission unit 21 having the configuration shown in FIG. 3 and the reception unit 61 having the configuration shown in FIG. 3 is placed. FIG. 11 shows a schematic configuration of the peripheries of the ultrasonic sensor 9. FIG. 11 shows the ultrasonic sensor 9 and the transport path 12 shown in FIG. 2, in an enlarged view. FIG. 11 horizontally shows the transport path 12. FIG. 11 shows the ultrasonic sensor 9, the transport path 12, a first sensor support member 81, and a second sensor support member 83.

The ultrasonic sensor 9 has the transmission unit 21 and the reception unit 61. The transmission unit 21 and the reception unit 61 are arranged at positions facing each other at the opposite sides of the transport path 12. The transmission unit 21 and the reception unit 61 are arranged tilting in relation to the transport path 12. Since the transmission unit 21 and the reception unit 61 are arranged tilting in relation to the transport path 12, the influence of the noise can be reduced.

The transmission unit 21 has the circuit board 25, the ultrasonic array 27, the wiring shield 29, the holder 31, and the filter 33. The ultrasonic array 27 of the transmission unit 21 is arranged at a position spaced apart from the transport path 12. The array opening 27*a* of the ultrasonic array 27 transmits an ultrasonic wave. The transmission unit 21 is arranged tilting in relation to the transport path 12. The vertical line VL passing through the center of the ultrasonic array 27 of the transmission unit 21 intersects the transport path 12 at an angle that is different from 90°.

The reception unit 61 has the circuit board 25, the ultrasonic array 27, the wiring shield 29, the holder 31, and the filter 33. The ultrasonic array 27, the wiring shield 29, the holder 31, and the filter 33 of the reception unit 61 are equivalent to an example of a second ultrasonic element, a second shield, a second holder, and a second protector, respectively.

The ultrasonic array 27 of the reception unit 61 has the array opening 27*a* receiving an ultrasonic wave. The array opening 27*a* of the reception unit 61 is equivalent to an example of a reception surface. The ultrasonic array 27 of the reception unit 61 is arranged at a position spaced apart from the transport path 12 in relation to the holder 31 of the reception unit 61.

The circuit board 25 of the reception unit 61 has the element wiring 37 arranged at the outer circumference of the array opening 27*a* of the reception unit 61 and coupled to the ultrasonic array 27. The element wiring 37 provided at the circuit board 25 of the reception unit 61 is equivalent to an example of a second wiring. The outer circumference of the array opening 27*a* of the reception unit 61 is equivalent to an example of a reception surface outer circumference.

The wiring shield 29 of the reception unit 61 covers the element wiring 37 arranged at the circuit board 25 of the reception unit 61. The wiring shield 29 of the reception unit 61 is provided with the wiring shield opening 29*a* at a position facing the array opening 27*a* of the reception unit 61. The wiring shield opening 29*a* of the reception unit 61 is equivalent to an example of a second shield opening.

The holder 31 of the reception unit 61 is arranged at a position facing the holder 31 of the transmission unit 21 from the opposite side of the transport path 12. The holder 31 of the reception unit 61 is provided with the holder opening 31*a* at a position facing the array opening 27*a* of the transmission unit 21. The holder opening 31*a* of the reception unit 61 is equivalent to an example of a second holder opening.

The filter 33 of the reception unit 61 is provided at a position facing the array opening 27*a* of the reception unit 61. The filter 33 of the reception unit 61 allows the passage of the ultrasonic wave transmitted from the transmission unit 21. The filter 33 of the reception unit 61 is arranged at the holder opening 31*a* of the reception unit 61.

The reception unit 61 is arranged tilting in relation to the transport path 12. The vertical line VL passing through the center of the ultrasonic array 27 of the reception unit 61 intersects the transport path 12 at an angle that is different from 90°.

The transport path 12 is formed by a first transport guide 85 and a second transport guide 87. The document M moves inside the transport path 12 between the first transport guide 85 and the second transport guide 87. The first transport guide 85 is arranged on the transmission unit 21 side. The second transport guide 87 is arranged on the reception unit 61 side.

The first transport guide 85 is provided with a first transport guide opening 85*a*. The first transport guide opening 85a allows the passage of the ultrasonic wave transmitted from the transmission unit 21. The first transport guide opening 85a is provided at a position facing the array opening 27a of the transmission unit 21. The shape of the first transport guide opening 85a is a quadrilateral shape, a circular shape, or the like. The size of the first transport guide opening 85a is greater than the size of the holder opening 31a of the transmission unit 21. Since the first transport guide opening 85a is formed to be greater than the holder opening 31a, the generation of a noise due to the reflection of the ultrasonic wave by the first transport guide 85 is restrained.

The second transport guide 87 is provided with a second transport guide opening 87a. The second transport guide opening 87a allows the passage of the ultrasonic wave transmitted from the transmission unit 21. The second transport guide opening 87a is provided at a position facing the array opening 27a of the reception unit 61. The shape of the second transport guide opening 87a is a quadrilateral shape, a circular shape, or the like. The size of the second transport guide opening 87a is greater than the size of the holder opening 31a of the reception unit 61. Since the second transport guide opening 87a is formed to be greater than the holder opening 31a, the generation of a noise due to the reflection of the ultrasonic wave by the second transport guide 87 is restrained.

The first sensor support member 81 supports the transmission unit 21. The first sensor support member 81 may be the casing of the image scanner 1 or may be a member supported by the casing. The first sensor support member 81 supports the transmission unit 21 in an attitude tilting in relation to the transport path 12.

The second sensor support member 83 supports the reception unit 61. The second sensor support member 83 may be the casing of the image scanner 1 or may be a member supported by the casing. The second sensor support member 83 supports the reception unit 61 in an attitude tilting in relation to the transport path 12.

The arrangement of the transmission unit 21 and the reception unit 61 is not limited to the arrangement shown in FIG. 11. The transmission unit 21 may be arranged on the second transport guide 87 side and the reception unit 61 may be arranged on the first transport guide 85 side.

The image scanner 1 transporting the document M has the transmission unit 21 including: the transport path 12 through which to transport the document M; the holder 31 having the holder opening 31a; the ultrasonic array 27 arranged spaced apart from the transport path 12 in relation to the holder 31 and transmitting an ultrasonic wave; the element wiring 37 arranged at the outer circumference of the array opening 27a of the ultrasonic array 27 and coupled to the ultrasonic array 27; the wiring shield 29 covering the element wiring 37; and the filter 33 facing the array opening 27a of the ultrasonic array 27 and having the filter opening 34 through which the ultrasonic wave passes. The wiring shield 29 is provided with the wiring shield opening 29a facing the array opening 27a. The holder opening 31a faces the array opening 27a. The filter 33 is arranged at the holder opening 31a.

As the filter 33 is arranged at the holder 31, the distance between the wiring shield 29 and the ultrasonic array 27 and the position of the filter 33 can be separately set. The image scanner 1 having the ultrasonic sensor 9 in which a drop in the detection accuracy is restrained since the noise based on the multiple reflection component of the ultrasonic wave due to the holder 31 and the noise based on the multiple reflection component of the ultrasonic wave due to the wiring shield 29 are not easily generated, can be designed.

The reception unit 61 of the image scanner 1 has: the holder 31 facing the holder 31 of the transmission unit 21; the ultrasonic array 27 arranged spaced apart from the transport path 12 in relation to the holder 31 and having the array opening 27a that receives an ultrasonic wave; the element wiring 37 arranged at the outer circumference of the array opening 27a and coupled to the ultrasonic array 27; the wiring shield 29 covering the element wiring 37; and the filter 33 that faces the array opening 27a of the ultrasonic array 27 and through which the ultrasonic wave passes. The wiring shield 29 of the reception unit 61 is provided with the wiring shield opening 29a facing the array opening 27a of the reception unit 61. The holder 31 of the reception unit 61 is provided with the holder opening 31a facing the array opening 27a of the reception unit 61. The filter 33 of the reception unit 61 is arranged at the holder opening 31a of the reception unit 61.

As the filter 33 of the reception unit 61 is arranged at the holder opening 31a of the reception unit 61, the image scanner 1 in which the noise generated in the reception unit 61 is restrained can be designed.

Second Embodiment

A second embodiment represents the image scanner 1 where the first transport guide 85 functions as the holder 31 of the transmission unit 21 having the configuration shown in FIG. 3. The second embodiment represents the image scanner 1 where the second transport guide 87 functions as the holder 31 of the reception unit 61 having the configuration shown in FIG. 3. FIG. 12 shows a schematic configuration of the peripheries of the ultrasonic sensor 9. FIG. 12 shows a configuration where the first transport guide 85 supports the filter 33 of the transmission unit 21. FIG. 12 shows a configuration where the second transport guide 87 supports the filter 33 of the reception unit 61. FIG. 12 shows the ultrasonic sensor 9, the transport path 12, the first sensor support member 81, and the second sensor support member 83.

The ultrasonic sensor 9 has the transmission unit 21 and the reception unit 61. The transmission unit 21 and the reception unit 61 are arranged at positions facing each other at the opposite sides of the transport path 12. The transmission unit 21 and the reception unit 61 are arranged tilting in relation to the transport path 12. Since the transmission unit 21 and the reception unit 61 are arranged tilting in relation to the transport path 12, the influence of the noise can be reduced.

The transmission unit 21 is formed of the circuit board 25, the ultrasonic array 27, the wiring shield 29, and a part of the first transport guide 85. The circuit board 25, the ultrasonic array 27, and the wiring shield 29 have the same configuration as the circuit board 25, the ultrasonic array 27, and the wiring shield 29 shown in FIG. 3 and the like. The ultrasonic array 27 of the transmission unit 21 is arranged at a position spaced apart from the transport path 12. The array opening 27a of the ultrasonic array 27 transmits an ultrasonic wave. The transmission unit 21 is arranged tilting in relation to the transport path 12. The vertical line VL passing through the center of the ultrasonic array 27 of the transmission unit 21 intersects the transport path 12 at an angle that is different from 90°.

The first transport guide 85 functions as the holder 31 of the transmission unit 21 shown in FIG. 3. The first transport guide 85 is provided with the first transport guide opening 85a at a position facing the array opening 27a of the ultrasonic array 27. The first transport guide opening 85a has the same function as the holder opening 31a. The first transport guide opening 85a is provided at a position facing the array opening 27a. The first transport guide opening 85a supports the filter 33. The first transport guide 85 is equivalent to an example of a holder. The first transport guide opening 85a is equivalent to an example of a holder opening.

The reception unit 61 is formed of the circuit board 25, the ultrasonic array 27, the wiring shield 29, and a part of the second transport guide 87. The circuit board 25, the ultrasonic array 27, and the wiring shield 29 have the same configuration as the circuit board 25, the ultrasonic array 27, and the wiring shield 29 shown in FIG. 3 and the like. The ultrasonic array 27, the wiring shield 29, and the filter 33 of the reception unit 61 are equivalent to an example of a second ultrasonic element, a second shield, and a second protector, respectively. The ultrasonic array 27, the wiring shield 29, and the filter 33 of the reception unit 61 have the same configuration as the ultrasonic array 27, the wiring shield 29, and the filter 33 of the reception unit 61 in the first embodiment.

The second transport guide 87 functions as the holder 31 of the reception unit 61 shown in FIG. 11. The second transport guide 87 is provided with the second transport guide opening 87a at a position facing the array opening 27a of the reception unit 61. The second transport guide opening 87a has the same function as the holder opening 31a of the reception unit 61. The second transport guide opening 87a is provided at a position facing the array opening 27a of the reception unit 61. The second transport guide opening 87a supports the filter 33 of the reception unit 61. The second transport guide 87 is equivalent to an example of a second holder. The second transport guide opening 87a is equivalent to an example of a second holder opening.

The first transport guide 85 and the second transport guide 87 form the transport path 12. The first transport guide 85 and the second transport guide 87 have a guide function to guide the document M and a function of supporting the filter 33.

The image scanner 1 transporting the document M has the transmission unit 21 including: the transport path 12 through which to transport the document M; the first transport guide 85 having the first transport guide opening 85a; the ultrasonic array 27 arranged spaced apart from the transport path 12 in relation to the first transport guide 85 and transmitting an ultrasonic wave; the element wiring 37 arranged at the outer circumference of the array opening 27a of the ultrasonic array 27 and coupled to the ultrasonic array 27; the wiring shield 29 covering the element wiring 37; and the filter 33 facing the array opening 27a of the ultrasonic array 27 and having the filter opening 34 through which the ultrasonic wave passes. The wiring shield 29 is provided with the wiring shield opening 29a facing the array opening 27a. The first transport guide opening 85a faces the array opening 27a. The filter 33 is arranged at the first transport guide opening 85a.

As the filter 33 is arranged at the first transport guide opening 85a, the distance between the wiring shield 29 and the ultrasonic array 27 and the position of the filter 33 can be separately set. The image scanner 1 having the ultrasonic sensor 9 in which a drop in the detection accuracy is restrained since the noise based on the multiple reflection component of the ultrasonic wave due to the first transport guide 85 and the noise based on the multiple reflection component of the ultrasonic wave due to the wiring shield 29 are not easily generated, can be designed.

The reception unit 61 of the image scanner 1 has: the second transport guide 87 facing the first transport guide 85 of the transmission unit 21; the ultrasonic array 27 arranged spaced apart from the transport path 12 in relation to the second transport guide 87 and having the array opening 27a that receives an ultrasonic wave; the element wiring 37 arranged at the outer circumference of the array opening 27a and coupled to the ultrasonic array 27; the wiring shield 29 covering the element wiring 37; and the filter 33 that faces the array opening 27a of the ultrasonic array 27 and through which the ultrasonic wave passes. The wiring shield 29 of the reception unit 61 is provided with the wiring shield opening 29a facing the array opening 27a of the reception unit 61. The second transport guide 87 of the reception unit 61 is provided with the second transport guide opening 87a facing the array opening 27a of the reception unit 61. The filter 33 of the reception unit 61 is arranged at the second transport guide opening 87a.

As the filter 33 of the reception unit 61 is arranged at the second transport guide opening 87a, the image scanner 1 in which the noise generated in the reception unit 61 is restrained can be designed.

What is claimed is:
1. An ultrasonic device comprising:
an ultrasonic element that has a transmission surface transmitting an ultrasonic wave and that transmits the ultrasonic wave in a direction intersecting the transmission surface;
a wiring arranged at a transmission surface outer circumference of the transmission surface and coupled to the ultrasonic element;
a shield covering the wiring, the shield having a shield opening that faces the transmission surface and through which the ultrasonic wave passes;
a holder arranged at a shield outer circumference of the shield and extending in the direction, the holder covering the shield via a space therebetween, the holder having a holder opening that faces the transmission surface and through which the ultrasonic wave passes;
a protector facing the transmission surface and being formed of a porous material through which the ultrasonic wave passes; and
a circuit board having a surface with which the ultrasonic element, the shield, and the wiring are supported,
wherein the protector is arranged at the holder opening, and
a width of the holder opening is larger than a width of the transmission surface in a plan view.
2. The ultrasonic device according to claim 1, wherein the holder opening is larger than each of the transmission surface and the shield opening.
3. The ultrasonic device according to claim 2, wherein the shield is arranged at a position more into the direction than the transmission surface, and
the shield opening is larger than the transmission surface.
4. The ultrasonic device according to claim 3, wherein an angle between an imaginary line connecting an edge of the shield opening and a center of the transmission surface and a vertical line on the transmission surface that passes through the center of the transmission surface is greater than a side lobe half-value angle corresponding to a half value of a side lobe of the ultrasonic wave transmitted from the transmission surface.
5. The ultrasonic device according to claim 1, wherein the shield is arranged at a position more into the direction than the transmission surface, and
the shield opening is larger than the transmission surface.

6. The ultrasonic device according to claim 5, wherein
an angle between an imaginary line connecting an edge of
the shield opening and a center of the transmission
surface and a vertical line on the transmission surface
that passes through the center of the transmission
surface is greater than a side lobe half-value angle
corresponding to a half value of a side lobe of the
ultrasonic wave transmitted from the transmission sur-
face.

7. A medium transport device that transports a medium,
the medium transport device comprising:
an ultrasonic transmission unit including:
a medium transport path through which the medium is
transported;
an ultrasonic element arranged spaced apart from the
medium transport path and transmitting an ultrasonic
wave;
a wiring arranged at a transmission surface outer cir-
cumference of a transmission surface of the ultra-
sonic element and coupled to the ultrasonic element;
a shield covering the wiring, the shield having a shield
opening that faces the transmission surface and
through which the ultrasonic wave passes;
a protector facing the transmission surface of the ultra-
sonic element and being formed of a porous material
through which the ultrasonic wave passes;
a holder covering the shield via a space therebetween,
the holder having a holder opening that faces the
transmission surface and through which the ultra-
sonic wave passes; and a circuit board having a surface with which the ultra-
sonic element, the shield, and the wiring are sup-
ported,
wherein the protector is arranged at the holder opening,
and
a width of the holder opening is larger than a width of the
transmission surface in a plan view.

8. The medium transport device according to claim 7,
further comprising:
an ultrasonic reception unit including:
a second holder facing the holder;
a second ultrasonic element arranged spaced apart from
the medium transport path in relation to the second
holder and having a reception surface that receives
the ultrasonic wave;
a second wiring arranged at a reception surface outer
circumference of the reception surface and coupled
to the second ultrasonic element;
a second shield covering the second wiring; and
a second protector that faces the reception surface of
the second ultrasonic element and through which the
ultrasonic wave passes,
wherein the second shield is provided with a second
shield opening that faces the reception surface,
the second holder is provided with a second holder
opening that faces the reception surface, and
the second protector is arranged at the second holder
opening.

* * * * *